(12) United States Patent
Xiong et al.

(10) Patent No.: US 12,098,070 B2
(45) Date of Patent: Sep. 24, 2024

(54) PURE CHLORINE DIOXIDE GENERATION SYSTEM WITH REDUCED ACID USAGE

(71) Applicant: ECOLAB USA INC., St. Paul, MN (US)

(72) Inventors: Kun Xiong, Naperville, IL (US); Nicholas R. Denny, Glen Ellyn, IL (US); Shawn Dalke, Sugar Grove, IL (US)

(73) Assignee: ECOLAB USA Inc., St. Paul, MN (US)

( * ) Notice: Subject to any disclaimer, the term of this patent is extended or adjusted under 35 U.S.C. 154(b) by 0 days.

(21) Appl. No.: 18/336,411

(22) Filed: Jun. 16, 2023

(65) Prior Publication Data

US 2023/0391619 A1 Dec. 7, 2023

Related U.S. Application Data

(62) Division of application No. 16/837,680, filed on Apr. 1, 2020, now Pat. No. 11,802,047.

(60) Provisional application No. 62/827,975, filed on Apr. 2, 2019.

(51) Int. Cl.
*C01B 11/00* (2006.01)
*C01B 11/02* (2006.01)
*C02F 1/68* (2023.01)

(52) U.S. Cl.
CPC .......... *C01B 11/024* (2013.01); *C01B 11/026* (2013.01); *C02F 1/68* (2013.01)

(58) Field of Classification Search
CPC ......... C01B 11/024; C01B 11/026; C02F 1/68
USPC ....................................................... 423/474
See application file for complete search history.

(56) References Cited

U.S. PATENT DOCUMENTS

| | | |
|---|---|---|
| 2,344,346 A | 3/1944 | Evans |
| 2,642,410 A | 6/1953 | Hoppens |
| 3,445,312 A | 5/1969 | Rider |
| 3,632,564 A | 1/1972 | Albert et al. |
| 3,697,470 A | 10/1972 | Haines et al. |
| 3,816,077 A | 6/1974 | Rosen et al. |
| 4,079,123 A | 3/1978 | Fuller et al. |
| 4,216,195 A | 8/1980 | Jaszka et al. |
| 4,393,035 A | 7/1983 | Fredette |
| 4,735,744 A | 4/1988 | Tsujimoto et al. |

(Continued)

FOREIGN PATENT DOCUMENTS

| | | |
|---|---|---|
| CN | 101304944 A | 11/2008 |
| CN | 102249842 A | 11/2011 |

(Continued)

OTHER PUBLICATIONS

Edwards, B.A., "Comparing reducing agents in a pilot scale ClO2 generator: does hydrogen peroxide measure up,?" Pulp & Paper Canada; Westmount vol. 97, Iss. 5, (May 1996): 34-37.

(Continued)

*Primary Examiner* — James E McDonough
(74) *Attorney, Agent, or Firm* — Eric D. Babych; Barnes & Thornburg LLP

(57) ABSTRACT

A method of producing chlorine dioxide is disclosed. The method may include feeding a reaction mixture into a separator. The reaction mixture may follow a helical path through the separator and produce gaseous chlorine dioxide within the separator. Gaseous chlorine dioxide may be withdrawn from the separator and used to disinfect process water.

17 Claims, 11 Drawing Sheets

(56) References Cited

U.S. PATENT DOCUMENTS

| | | | |
|---|---|---|---|
| 5,254,760 A | 10/1993 | Winter et al. | |
| 5,272,231 A | 12/1993 | Campbell et al. | |
| 5,296,567 A | 3/1994 | Baumann et al. | |
| 5,324,497 A | 6/1994 | Westerlund | |
| 5,374,697 A | 12/1994 | Muller | |
| 5,396,004 A | 3/1995 | Arhancet et al. | |
| 5,710,329 A | 1/1998 | Clever | |
| 5,728,872 A | 3/1998 | Riemenschneider | |
| 5,856,562 A | 1/1999 | Mine et al. | |
| 5,877,344 A | 3/1999 | Gande et al. | |
| 5,888,356 A | 3/1999 | Keil et al. | |
| 5,955,643 A | 9/1999 | Lewis | |
| 6,051,135 A | 4/2000 | Lee et al. | |
| 6,210,536 B1 | 4/2001 | Grossi et al. | |
| 6,287,483 B1 | 9/2001 | DeMassa et al. | |
| 6,300,513 B2 | 10/2001 | Sakamoto et al. | |
| 6,300,533 B1 | 10/2001 | Benage et al. | |
| 6,337,426 B1 | 1/2002 | Winter | |
| 6,342,647 B1 | 1/2002 | Roof et al. | |
| 6,344,560 B1 | 2/2002 | Geelan et al. | |
| 6,348,598 B1 | 2/2002 | Doi et al. | |
| 6,352,619 B1 | 3/2002 | Fauconet et al. | |
| 6,403,850 B1 | 6/2002 | Benage et al. | |
| 6,409,887 B1 | 6/2002 | Pryce et al. | |
| 6,518,374 B1 | 2/2003 | Aichinger et al. | |
| 6,518,452 B1 | 2/2003 | Aichinger et al. | |
| 6,608,226 B1 | 8/2003 | Reid et al. | |
| 6,642,337 B1 | 11/2003 | Misiak et al. | |
| 6,660,181 B2 | 12/2003 | Benage et al. | |
| 6,770,219 B2 | 8/2004 | Tong | |
| 6,790,427 B2 | 9/2004 | Charles et al. | |
| 6,806,385 B1 | 10/2004 | Hammon et al. | |
| 6,864,313 B2 | 3/2005 | Wunderlich et al. | |
| 6,956,130 B2 | 10/2005 | Riondel et al. | |
| 7,005,087 B2 | 2/2006 | Tong | |
| 7,022,220 B2 | 4/2006 | Benage et al. | |
| 7,041,711 B2 | 5/2006 | Kunita | |
| 7,056,642 B2 | 6/2006 | Kano et al. | |
| 7,119,224 B2 | 10/2006 | Schroeder et al. | |
| 7,261,821 B2 | 8/2007 | Beardwood | |
| 7,368,594 B2 | 5/2008 | Yurugi et al. | |
| 7,414,162 B2 | 8/2008 | Link et al. | |
| 7,420,013 B2 | 9/2008 | Riegel et al. | |
| 7,504,074 B2 | 3/2009 | Martens et al. | |
| 7,553,896 B2 | 6/2009 | Ma et al. | |
| 7,621,821 B2 | 11/2009 | Tsai et al. | |
| 7,682,592 B2 | 3/2010 | Charles et al. | |
| 7,799,198 B2 | 9/2010 | Nanjundiah et al. | |
| 8,691,994 B2 | 4/2014 | Tong | |
| 8,907,121 B2 | 12/2014 | Johnson et al. | |
| 9,133,288 B2 | 9/2015 | Loyns et al. | |
| 9,399,622 B2 | 7/2016 | Tong | |
| 9,534,065 B2 | 1/2017 | Nakaya et al. | |
| 9,561,997 B2 | 2/2017 | Dafinger et al. | |
| 9,573,874 B2 | 2/2017 | Fruchey et al. | |
| 9,611,336 B2 | 4/2017 | Mo et al. | |
| 9,656,891 B2 | 5/2017 | Martin | |
| 9,725,649 B2 | 8/2017 | Subramaniyam | |
| 9,783,480 B2 | 10/2017 | Aizawa et al. | |
| 9,884,795 B2 | 2/2018 | Mo et al. | |
| 9,884,951 B2 | 2/2018 | Tong | |
| 9,914,701 B2 | 3/2018 | Masere et al. | |
| 9,932,291 B2 | 4/2018 | Mendoza et al. | |
| 9,957,209 B2 | 5/2018 | Masere et al. | |
| 10,112,888 B2 | 10/2018 | Tong | |
| 10,221,255 B2 | 3/2019 | Marguerre et al. | |
| 10,308,585 B2 | 6/2019 | Tong | |
| 10,532,320 B2 | 1/2020 | Boam et al. | |
| 10,640,449 B2 | 5/2020 | Atkins et al. | |
| 10,696,618 B2 | 6/2020 | Tong | |
| 10,745,345 B2 | 8/2020 | Khanlari et al. | |
| 10,781,157 B2 | 9/2020 | Cabon et al. | |
| 10,869,444 B2 | 12/2020 | Masere et al. | |
| 11,104,626 B2 | 8/2021 | Masere et al. | |
| 11,174,439 B2 | 11/2021 | Vachon et al. | |
| 11,180,578 B2 | 11/2021 | Masere et al. | |
| 2001/0005755 A1 | 6/2001 | Sakamoto et al. | |
| 2001/0009929 A1 | 7/2001 | Blankenship et al. | |
| 2004/0031674 A1 | 2/2004 | Schroder | |
| 2004/0175322 A1 | 9/2004 | Woodruff et al. | |
| 2004/0236143 A1 | 11/2004 | Martan et al. | |
| 2005/0010065 A1 | 1/2005 | Wartini et al. | |
| 2005/0139807 A1 | 6/2005 | Tong | |
| 2006/0051285 A1 | 3/2006 | Hawker et al. | |
| 2006/0096930 A1* | 5/2006 | Beardwood | C02F 1/008 210/745 |
| 2006/0120946 A1 | 6/2006 | Simic et al. | |
| 2006/0287548 A1 | 12/2006 | Hoefer et al. | |
| 2007/0116637 A1 | 5/2007 | Woodruff et al. | |
| 2007/0152187 A1 | 7/2007 | Truchlaeft | |
| 2007/0167650 A1 | 7/2007 | Ishikawa et al. | |
| 2008/0021241 A1 | 1/2008 | Carlson, Jr. et al. | |
| 2009/0203938 A1 | 8/2009 | Croizy et al. | |
| 2010/0168434 A1 | 7/2010 | Loyns et al. | |
| 2010/0219371 A1 | 9/2010 | Paul | |
| 2011/0160484 A1 | 6/2011 | Fruchey et al. | |
| 2011/0290635 A1 | 12/2011 | Kar et al. | |
| 2012/0203020 A1 | 8/2012 | Tong | |
| 2012/0244063 A1 | 9/2012 | Pohjanvesi | |
| 2013/0178652 A1 | 7/2013 | Fruchey et al. | |
| 2013/0209349 A1* | 8/2013 | Vilhelmsson | B01J 19/32 423/478 |
| 2014/0097095 A1 | 4/2014 | Moser | |
| 2014/0228604 A1 | 8/2014 | Colorado, Jr. et al. | |
| 2014/0302176 A1 | 10/2014 | Grund et al. | |
| 2015/0152053 A1 | 6/2015 | Tong | |
| 2016/0083323 A1 | 3/2016 | Fruchey et al. | |
| 2016/0102189 A1 | 4/2016 | Tong | |
| 2016/0122643 A1 | 5/2016 | Fruchey et al. | |
| 2018/0044180 A1 | 2/2018 | Burke et al. | |
| 2018/0057740 A1 | 3/2018 | Cavezzan et al. | |
| 2018/0264431 A1* | 9/2018 | Leeton | B01J 19/242 |
| 2018/0265447 A1 | 9/2018 | Linemann et al. | |
| 2018/0273381 A1 | 9/2018 | Xiong et al. | |
| 2018/0361319 A1 | 12/2018 | Boam et al. | |
| 2019/0023641 A1 | 1/2019 | Chretien et al. | |
| 2019/0185769 A1 | 6/2019 | Cuoq et al. | |
| 2020/0017610 A1 | 1/2020 | Masere et al. | |
| 2020/0102408 A1 | 4/2020 | Masere | |
| 2020/0277249 A1 | 9/2020 | Dafinger et al. | |
| 2020/0283597 A1 | 9/2020 | Pelati | |
| 2020/0339880 A1 | 10/2020 | Masere et al. | |
| 2021/0108141 A1 | 4/2021 | Masere | |
| 2021/0380523 A1 | 12/2021 | Bellini et al. | |

FOREIGN PATENT DOCUMENTS

| | | |
|---|---|---|
| CN | 103073375 A | 5/2013 |
| CN | 105482851 A | 4/2016 |
| CN | 106103340 A | 11/2016 |
| CN | 106512879 A | 3/2017 |
| CN | 106554244 A | 4/2017 |
| CN | 106588647 A | 4/2017 |
| CN | 107987888 A | 5/2018 |
| CN | 108191640 A | 6/2018 |
| CN | 112028770 A | 12/2020 |
| CN | 113024447 A | 6/2021 |
| CN | 113457571 A | 10/2021 |
| CZ | 294776 B6 | 3/2005 |
| EP | 0325059 A2 | 7/1989 |
| EP | 0697386 A1 | 2/1996 |
| EP | 0569502 B1 | 4/1996 |
| EP | 0791573 A1 | 8/1997 |
| EP | 0620206 B2 | 5/2000 |
| EP | 1077206 A1 | 2/2001 |
| EP | 0845448 B1 | 1/2002 |
| EP | 1694715 B1 | 10/2007 |
| EP | 1248757 B1 | 11/2007 |
| EP | 2017293 A1 | 1/2009 |
| EP | 2257519 B1 | 8/2011 |
| EP | 2066613 B1 | 6/2012 |
| EP | 2903961 B1 | 11/2016 |
| EP | 2670800 B1 | 1/2018 |
| EP | 2504308 B1 | 5/2021 |

(56) References Cited

FOREIGN PATENT DOCUMENTS

| | | |
|---|---|---|
| GB | 590680 A | 7/1947 |
| GB | 688206 A | 3/1953 |
| GB | 2093464 A | 9/1982 |
| JP | H1143449 A | 2/1999 |
| JP | 2000063371 A | 2/2000 |
| JP | 2000072718 A | 3/2000 |
| JP | 2001069429 A | 3/2001 |
| JP | 2001163831 A | 6/2001 |
| JP | 3187345 B2 | 7/2001 |
| JP | 3197947 B2 | 8/2001 |
| JP | 3227204 B2 | 11/2001 |
| JP | 3235980 B2 | 12/2001 |
| JP | 3312639 B2 | 8/2002 |
| JP | 3529613 B2 | 5/2004 |
| JP | 2006199736 A | 8/2006 |
| JP | 2006282541 A | 10/2006 |
| JP | 4225707 B2 | 2/2009 |
| JP | 4270821 B2 | 6/2009 |
| JP | 4520092 B2 | 8/2010 |
| JP | 4548821 B2 | 9/2010 |
| JP | 4548822 B2 | 9/2010 |
| JP | 4582641 B2 | 11/2010 |
| JP | 5191702 B2 | 5/2013 |
| JP | 5334390 B2 | 11/2013 |
| JP | 6032463 B2 | 11/2016 |
| JP | 6158044 B2 | 7/2017 |
| JP | 6705120 B2 | 6/2020 |
| JP | 2020200465 A | 12/2020 |
| SU | 957153 A1 | 9/1982 |
| WO | 1999007664 A1 | 2/1999 |
| WO | 1999055797 A1 | 11/1999 |
| WO | 2000031005 A1 | 6/2000 |
| WO | 2000037412 A1 | 6/2000 |
| WO | 2000064947 A1 | 11/2000 |
| WO | 2001040404 A1 | 6/2001 |
| WO | 2001047844 A1 | 7/2001 |
| WO | 2002051784 A1 | 7/2002 |
| WO | 2007063031 A2 | 6/2007 |
| WO | 2010094982 A1 | 8/2010 |
| WO | 2015140549 A1 | 9/2015 |
| WO | 2017041204 A1 | 3/2017 |
| WO | 2017081611 A1 | 5/2017 |
| WO | 2017091599 A1 | 6/2017 |
| WO | 2017187150 A1 | 11/2017 |
| WO | 2018164226 A1 | 9/2018 |
| WO | 2018221314 A1 | 12/2018 |
| WO | 2019142887 A1 | 7/2019 |
| WO | 2020038496 A2 | 2/2020 |
| WO | 2020183105 A1 | 9/2020 |
| WO | 2021022550 A1 | 2/2021 |

OTHER PUBLICATIONS

International Search Report and Written Opinion, International Application No. PCT/US2020/026210, Dated Jun. 17, 2020, 12 pgs.
Appelt, M. and Schmidt-Naake, G. "Stable Free-Radical Copolymerization of Styrene with Acrylates Using OH-Tempo," Macromolecular Chemistry and Physics, 2004, vol. 205(6), pp. 637-644.
Bragd, P.L., Besemer, A.C., van Bekkum, H. "Tempo-derivatives as catalysts in the oxidation of primary alcohol groups in carbohydrates,"Journal of Molecular Catalysis A: Chemical, 2001, vol. 170(1-2), pp. 35-42.
Brinkmann-Rengel, S., N. Niessner. "Controlled Radical Copolymerization of Styrene and Acrylonitrile," American Cancer Society Symposium Series, chapter 28, vol. 768, Aug. 15, 2000, https://pubs.acs.org/doi/abs/10.1021/bk-2000-0768.ch028.
Edeleva, M.V., Marque, S.R., Bagryanskaya, E.G. "Imidazoline and imidazolidine nitroxides as controlling agents in nitroxide-mediated pseudoliving radical polymerization," Russian Chemical Reviews, Apr. 2018, vol. 87(4), pp. 328-349.
Edwards, B. A. "Comparing reducing agents in a pilot scale ClO2 generator: does hydrogen peroxide measure up?," Pulp & Paper Canada, 1996, vol. 97(5), pp. 34-37.
Georgieff, K.K. "Relative Inhibitory Effect of Various Compounds on the Rate of Polymerization of Methyl Methacrylate," Journal of Applied Polymer Science, 1965, vol. 9(6), pp. 2009-2018.
Goldfein, M.D., Gladyshev, G.P. "Kinetics and Mechanism of the Inhibited Polymerisation of Vinyl Monomers," Russian Chemical Reviews, 1988, vol. 57(11), p. 1083-1097.
Ichihara, K., Kawamura, I., Sakakibara, K. et al. "Inhibitory regulation mechanism of naphthoquinone and its derivatives in radical polymerization," Journal of Physical Organic Chemistry, 2019, vol. 32(6), pp. 1-11.
Kuznetsova, Y.L., Mozaleva, P.G., Vavilova, A.S., et al. "Polymerization of methyl methacrylate in the presence of 2,5-di-tert-butyl-p-benzoquinone," Russian Chemical Bulletin, Apr. 2020, vol. 69(4), pp. 763-767.
Li, R. and F.J.Schork. "Modeling of the Inhibition Mechanism of Acrylic Acid Polymerization," Industrial & Engineering Chemistry Research, 2006, vol. 45(9), pp. 3001-3008.
Ludin, D.V., Kuznetsova, Y.L., Zamyshlyaeva, O.G., Zaitsev, S.D. "Controlled Radical Copolymerization of Styrene and tert-Butyl Acrylate in the Presence of Tri-n-butylborane-p-Quinone Catalytic System," Polymer Science, Series B, 2017, vol. 59(1), pp. 7-15.
Ma, Y. Chapter 3: Mechanistic Investigation of Nitroxide-based Polymerization Inhibitors, Mar. 15, 2012, Doctoral Dissertion, University of York, pp. 77-143.
Naz, A., Sattar, R., Siddiq, M. "Polymer membranes for biofouling mitigation: a review," Polymer-Plastics Technology and Materials, 2019, vol. 58(17), pp. 1829-1854.
Niesbach, A., Daniels, J., Schröter, B., et al. "The inhibition of acrylic acid and acrylate ester polymerisation in a heterogeneously catalysed pilot-scale reactive distillation column," Chemical Engineering Science, 2013, vol. 88, pp. 95-107.
Okutsu, R., S. Ando, and M. Ueda. "Sulfur-Containing Poly (meth)acrylates with High Refractive Indices and High Abbe's Numbers," Chemistry of Materials, 2008, vol. 20(12), pp. 4017-4023.
Pavlovskay, M.V., Smirnova, N.N., Markin, et al. "Synthesis of Block Copolymers from Polyvinyl Chloride Prepared in the Presence of Nitroxyl Radicals of the Imidazoline Series," Russian Journal of Applied Chemistry, 2014, vol. 87(3), pp. 324-330.
Rodriquez, B., Oztruk, D. et al. "Antibiofouling thin-film composite membranes (TFC) by in situ formation of Cu-(m-phenylenediamine) oligomer complex," Journal of Materials Science, Jan. 23, 2018, vol. 53, pp. 6325-6338.
Shushunova, N.Y., Arsenyev, M.V., Glukhova, T.A., et al. "Polymerization of Butyl Acrylate and Butyl Methacrylate in the Presence of o-Quinone Methacrylate," Polymer Science Series B, 2015, vol. 57(3), pp. 207-216.
Wang, Y., Meng X., Wu H., et al. "Improving permeability and anti-fouling performance in reverse osmosis application of polyamide thin film nanocomposite membrane modified with functionalized carbon nanospheres," Separation and Purification Technology, 2021, vol. 270, pp. 1-11.
Weng, S.and J. Zhang. "N-Oxyl-Radical-Catalyzed Intermolecular Aminooxygenation of Styrenes and Inter/intramolecular Aminoalkoxylation of Homoallylic Alcohols," ChemCatChem, 2016, vol. 8(24), pp. 3720-3724.
Yin, W., Chu, C., Lu, Q. et al. "Iron Chloride/4-Acetamido-Tempo/Sodium Nitrite-Catalyzed Aerobic Oxidation of Primary Alcohols to the Aldehydes," Advanced Synthesis & Catalysis, 2010, vol. 352, pp. 113-118.
International Search Report and Written Opinion, PCT/US2020/026210, dated Jun. 17, 2020, 12 pages.
International Search Report and Written Opinion, PCT/US2023/065015, dated Jul. 17, 2023, 10 pages.
International Search Report and Written Opinion, PCT/US2023/065018, dated Jul. 7, 2023, 8 pages.
International Search Report and Written Opinion, PCT/US2023/065022, dated Jul. 26, 2023, 8 pages.
International Search Report and Written Opinion, PCT/US2023/065048, dated Jul. 14, 2023, 11 pages.
International Search Report and Written Opinion, PCT/US2023/065050, dated Jul. 7, 2023, 10 pages.

(56) References Cited

OTHER PUBLICATIONS

International Search Report and Written Opinion, PCT/IB2023/060631, dated Feb. 14, 2024, 11 pages.
International Search Report and Written Opinion, PCT/US2023/069730, dated Oct. 23, 2023, 12 pages.
International Search Report and Written Opinion, PCT/US2023/069702, dated Oct. 18, 2023, 16 pages.

* cited by examiner

PURE CHLORINE DIOXIDE GENERATION SYSTEM WITH REDUCED ACID USAGE

BACKGROUND

1. Field of the Invention

The present disclosure generally relates to methods of generating chlorine dioxide and treating process water by generating chlorine dioxide onsite.

2. Description of the Related Art

With the decline of gaseous chlorine as a microbiocide, various alternatives have been explored; including bleach, bleach with bromide, bromo-chloro dimethylhydantoin, ozone, and chlorine dioxide ($ClO_2$). Of these, chlorine dioxide has generated a great deal of interest for control of microbiological growth in a number of different industries, including the dairy industry, the beverage industry, the pulp and paper industry, the fruit and vegetable processing industries, various canning plants, the poultry industry, the beef processing industry and miscellaneous other food processing applications. Chlorine dioxide is also seeing increased use in municipal potable water treatment facilities and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against *legionella*, algae and amoebal cysts, giardia cysts, coliforms, *salmonella, shigella*, and cryptosporidium.

Unfortunately, chlorine dioxide in solution is unstable with an extremely short shelf life and thus, is only available in less than 3000 ppm as liquid product, commercially. For applications where large quantity of chlorine dioxide is needed, it must typically be generated at its point of use such as, for example, by a reaction between a metal chlorate or metal chlorite in aqueous solution and a liquid phase strong acid. However, the use of liquid phase strong acids poses handling issues and safety concerns.

BRIEF SUMMARY

A method of producing chlorine dioxide is disclosed. The method may include feeding a reaction mixture into a separator; directing the reaction mixture in a helical path through the separator; producing gaseous chlorine dioxide within the separator; and withdrawing the gaseous chlorine dioxide from the separator.

In some aspects, the method may include feeding a first solution comprising an acid through a first feed line into a mixing device; feeding a second solution comprising chlorite or chlorate through a second feed line into the mixing device; and mixing the first solution and the second solution in the mixing device to form the reaction mixture. The mixing device may be in fluid communication with the separator.

A method of treating process water is provided. The method may include feeding a first solution comprising an acid through a first feed line into a mixing device; feeding a second solution comprising chlorite or chlorate through a second feed line into the mixing device; mixing the first solution and the second solution in the mixing device to form the reaction mixture, wherein the mixing device is in fluid communication with the separator; producing chlorine dioxide in the separator; withdrawing the chlorine dioxide from the separator; and injecting the chlorine dioxide into the process water.

In some aspects, the method may include reacting the acid with the chlorite or the chlorate to produce chlorine dioxide in the separator.

In some aspects, the acid is hydrochloric acid, phosphoric acid, sulfuric acid, hypochlorous acid, or any combination thereof.

In some aspects, the acid comprises sulfuric acid and the second solution comprises chlorate and hydrogen peroxide.

In some aspects, the acid comprises hydrochloric acid and the second solution comprises chlorite.

In some aspects, the helical path is defined by a tube having a coiled configuration having a coil plane angle of about 1 degree to about 60 degrees.

In some aspects, the first feed line and the second feed line are opposite to and directed against each other.

In some aspects, the separator may be operated at a pressure about equal to or less than atmospheric pressure.

In some aspects, the reaction mixture may have a residence time in the separator of about 0.1 minute to about 1 hour.

In some aspects, the method may include producing the chlorine dioxide at a rate ranging from about 0.001 lb/hour to about 200 lb/hour.

In some aspects, the method may include operating the separator at a temperature ranging from about 2° C. to about 80° C.

In some aspects, the reaction mixture may be fed into a top portion of the separator.

In some aspects, the reaction mixture may be fed into a bottom portion of the separator.

In some aspects, the reaction mixture may be fed into a middle portion of the separator.

In some aspects, the method may include withdrawing liquid from the separator and recycling the liquid to the separator.

In some aspects, the helical path may be defined by a plurality of plates disposed within the separator.

In some aspects, the plurality of plates comprises a plate having perforations.

In some aspects, the reaction may have an average conversion efficiency is at least about 90%.

A method of treating process water is provided. The method may include producing chlorine dioxide as described herein and injecting the gaseous chlorine dioxide into the process water.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
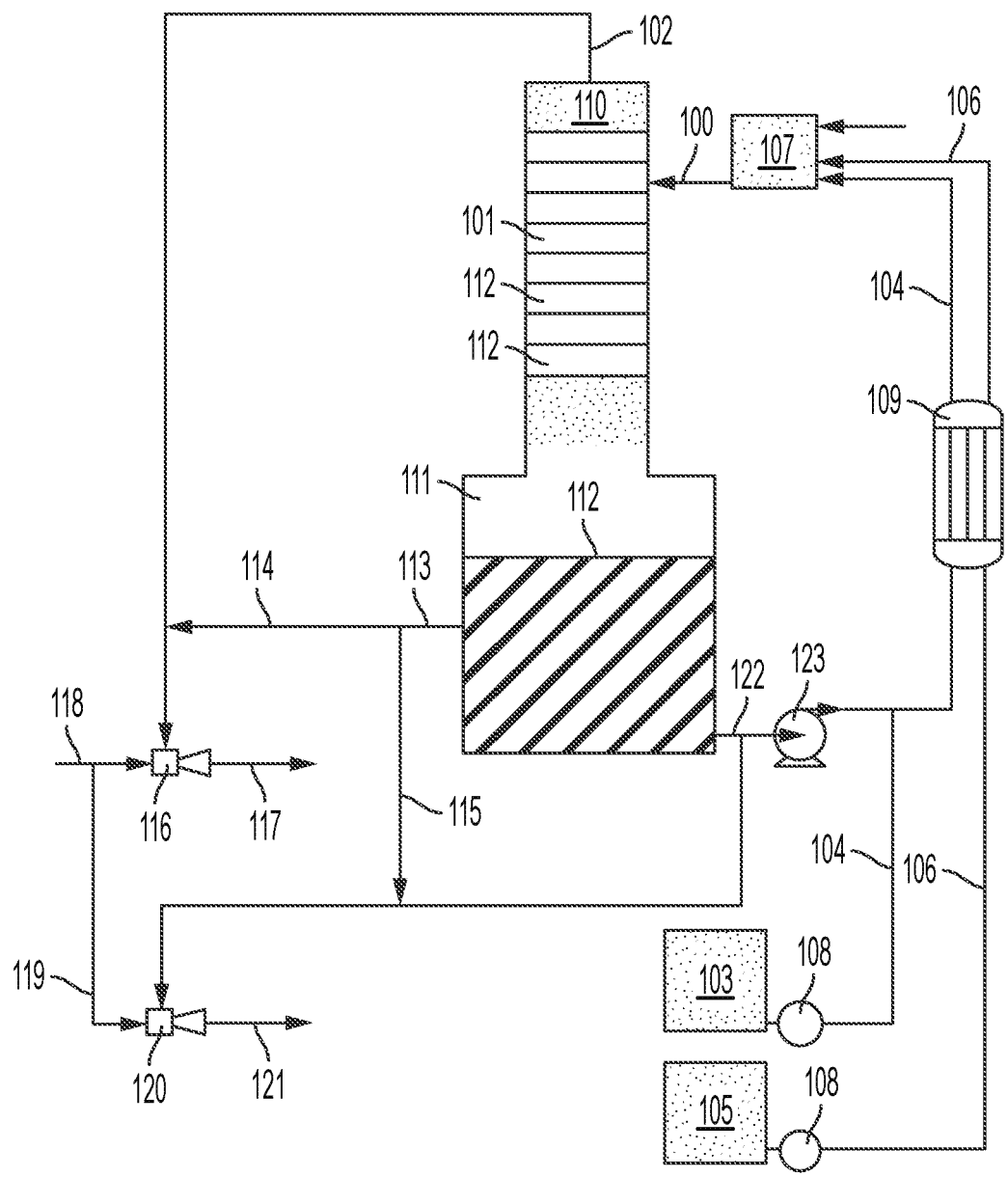
FIG. 1 shows an embodiment of an embodiment of a system for generating chlorine dioxide.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Referring to the figures, FIG. 1 shows a reactant feed line 100 in fluid communication with a separator 101. The separator 101 may be in fluid communication with a product line 102 that may withdraw gaseous products. An acid may be stored in first storage container 103 that is in fluid communication with the first feed line 104. A chlorate or chlorite may be stored in a second storage container 105 and may be in fluid communication with a second feed line 106. The first feed line 104 and the second feed line 106 may be in fluid communication with a mixer 107. Motive water may also be fed into the mixer. The first and second solutions mix in the mixer 107 and then pass through the reactant feed line 100 into the separator 101. The acid may react with the chlorite or the chlorate to produce chlorine dioxide in the separator 101. As chlorine dioxide is generated, it may be withdrawn from the separator 101 into a product line 102.

In some aspects, the acid is hydrochloric acid, phosphoric acid, sulfuric acid, hypochlorous acid, or any combination thereof. In some aspects, the acid comprises sulfuric acid. The second solution may include a mixture of chlorate and hydrogen peroxide.

In some aspects, the first solution may consist of or comprise sulfuric acid and water, where the sulfuric acid concentration ranges from about 50% by weight to about 98% by weight. The sulfuric acid concentration in the first solution may be about 78%. In some aspects, the second solution may comprise or consist of chlorate, hydrogen peroxide, and water. The second solution may comprise a concentration of chlorate that is in a range of about 25% by weight to about 60% by weight. The concentration of chlorate in the second solution may be about 40% by weight. The concentration of hydrogen peroxide in the second solution may be in the range of about 2% by weight to about 30% by weight. The concentration of hydrogen peroxide in the second solution may be about 8% by weight. In some aspects, the acid may be sulfuric acid and the chlorate may be sodium chlorate.

In other aspects, the acid comprises hydrochloric acid and the second solution comprises chlorite.

The separator 101 may have a top portion 110 and a bottom portion 111. A plurality of plates 112 may be disposed within the separator 101 that define the helical path by which the reactant mixture flows. Liquid may accumulate at the bottom of the separator 101. The level of the liquid 112 in the separator may be controlled and adjusted by one of ordinary skill in the art to maximize production of gaseous chlorine dioxide.

As used herein, "helical path" refers to the trajectory of the reactant mixture as it flows through the separator. The term "helical path" may include any non-linear path through the separator but does not include coincidental helical pathway of liquid in a container that is being mixed, for example in a continuously stirred-tank reactor or a batch reactor with a mechanical stirring device. The helical path may be defined by plates, tubes, or perforations in tubes or plates inside the separator. The helical path may proceed from top of the separator to the bottom or from the bottom to the top of the separator.

Liquid products or unreacted chemicals in the bottom of the separator 101 may be withdrawn into a recycle line 122 or a liquid product withdrawal line 113 that may be split into a line 114 that is mixed with the product line 102 or into line 115 that is fed into waste disposal.

Motive water may be fed through a motive water line 118 into an eductor 116 and mixed with the products in line 102 and fed into a treatment line 117 that may be in fluid communication with a process. For example, the treatment line 117 may carry chlorine dioxide to cooling tower water to disinfect the water. Another motive water line 119 may carry water into an eductor 120 that mixes liquid from line 115 and feed it into line 121 that carries the liquid to waste disposal or for use in a different process.

In some aspects, the first solution in the first feed line 104 and second solution in the second feed line 106 may pass through a heat exchanger 109. The heat exchanger 109 may adjust the temperature of the feed solutions to maximize conversion and minimize adverse reactions when the solutions are mixed. For example, the temperature of the solutions in the first and second feed lines can be adjusted to a temperature between about 2° C. to about 80° C.

In some aspects, a pump 123 may be connected to the recycle line 122 and feed liquid into the heat exchanger 109. A pump 108 may be connected to reactant storage containers to feed the solutions into the separator.

In some aspects, the method may include measuring a temperature of the first and/or the second solutions. The temperature may be measured before entering the heat exchanger. If a third reactant is mixed, the method may include measuring a temperature of the third reactant.

Figure 2:
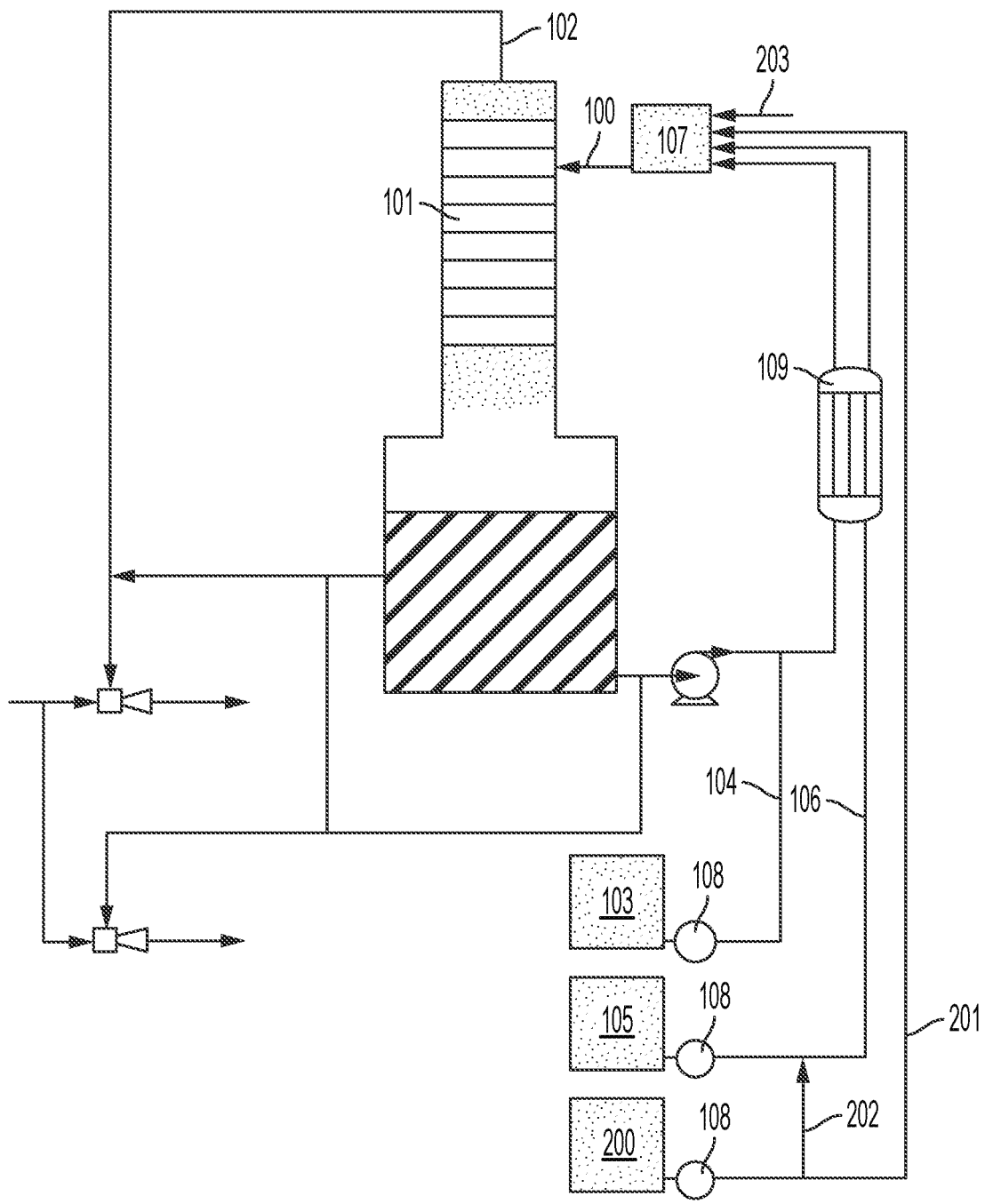
FIG. 2 shows an embodiment of a chlorine dioxide generation system where three reactants are mixed and fed into the separator.

FIG. 2 shows a system configuration where a third storage container 200 may store additional reactants that can be pumped by pump 108 into the third feed line 201 to be fed into the mixer 107. The third solution in third feed line 201 may be mixed with the first and second solutions in the mixer 107.

In some aspects, a portion of the third solution may be diverted through line 202 and mixed with the second solution in the second feed line 106 before entering the heat exchanger 109.

In some aspects, the first solution may be an acid, the second solution may be chlorate, and the third solution may be hydrogen peroxide.

Figure 3:
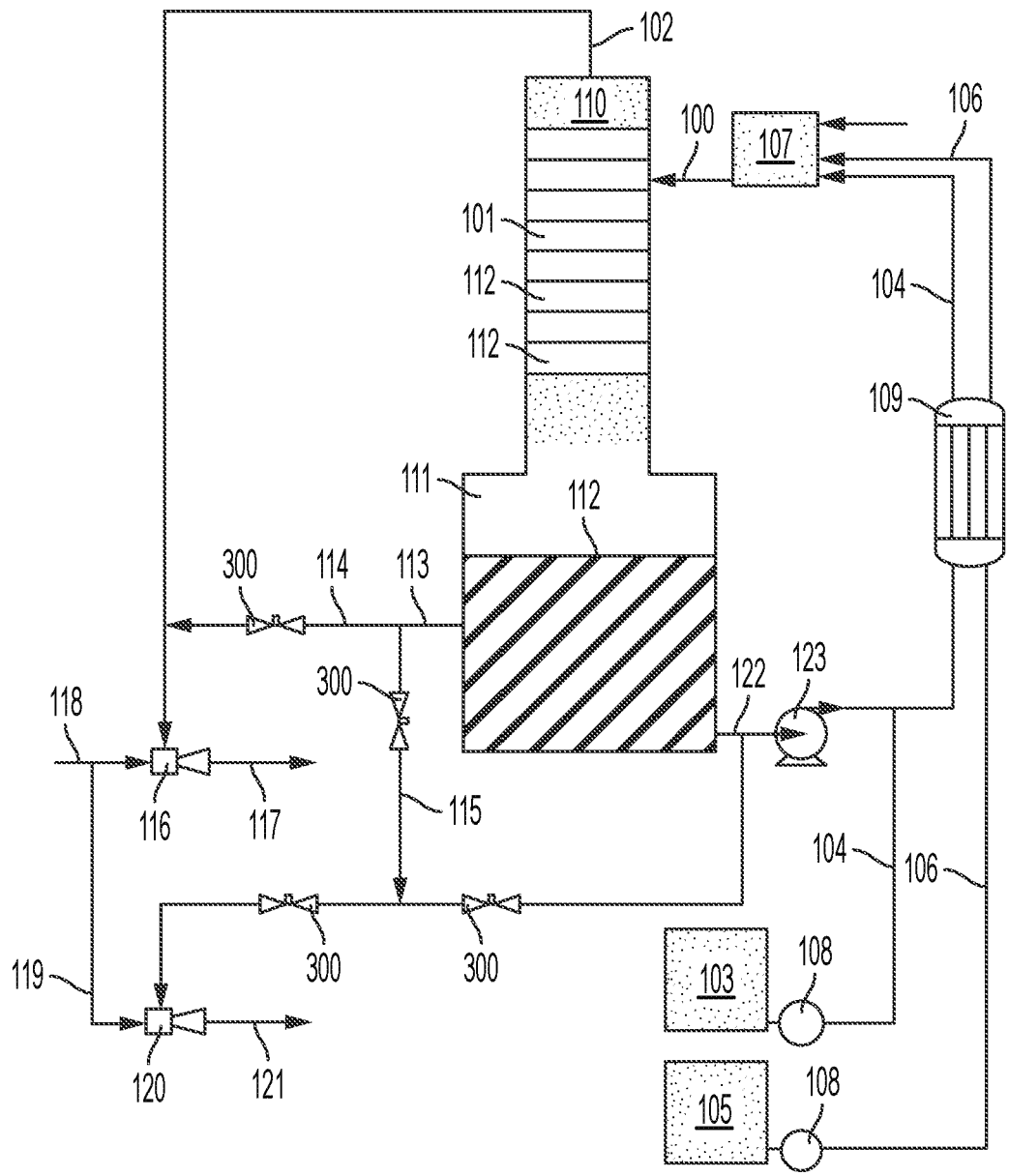
FIG. 3 shows an embodiment of a chlorine dioxide generation system having control valves.

FIG. 3 shows that the lines valves 300 can be placed on certain lines to control flow through various portions of the system. For example, the liquid level 112 in the separator 101 can be controlled using valves on certain liquid product lines. Alternatively, the liquid level 112 may be adjusted by varying the pump rate of pump 123 and outlet height level of line 113.

In some aspects, chlorine dioxide in line 102 may be combined with reactants from line 114, which is controlled by valve 300. In some aspects, the chlorine dioxide in line 102 may be fed to process water via line 117 without mixing with liquid in line 114. The reactants in line 114 may be fed to the process via line 121 for pH control.

Figure 4:
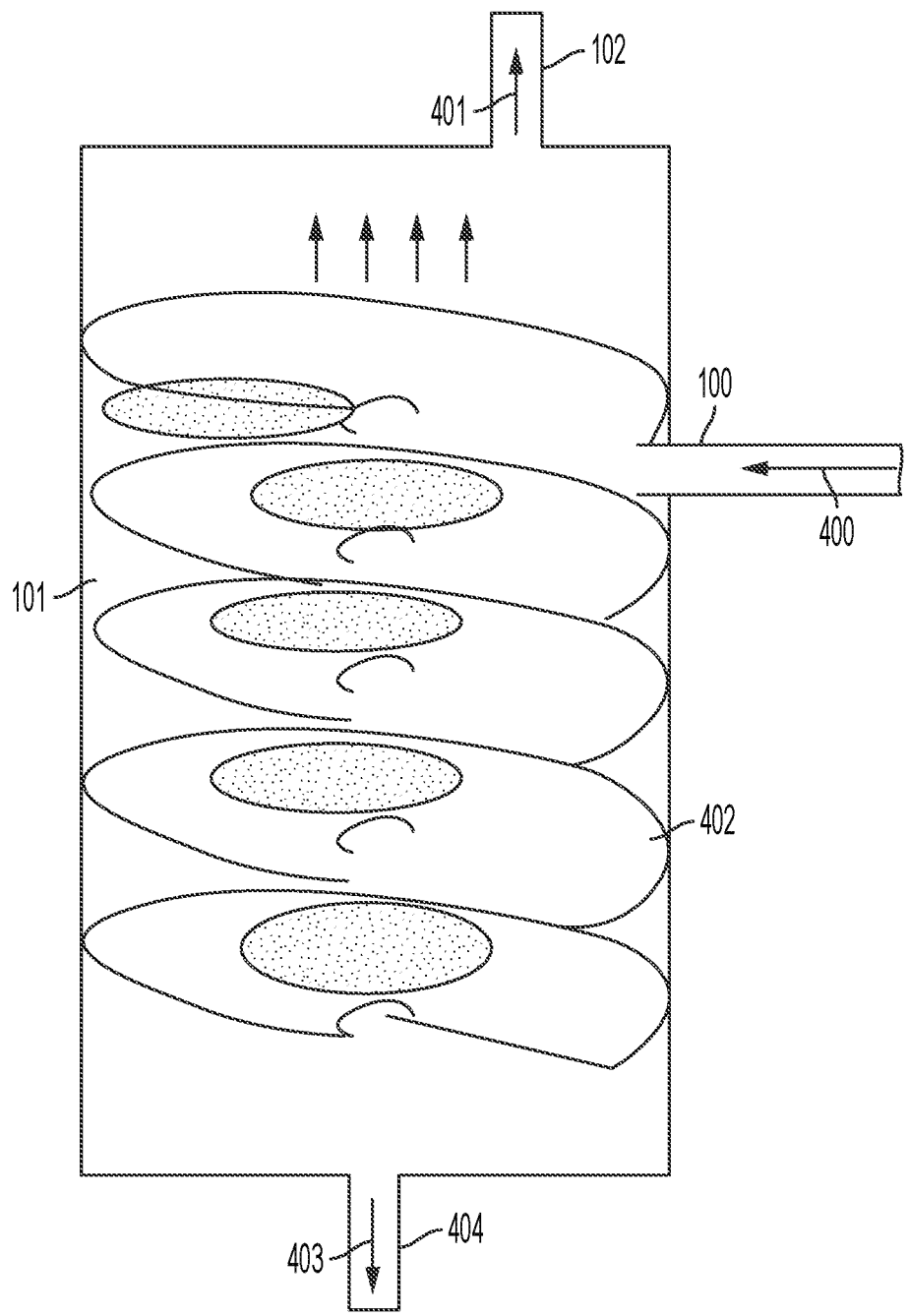
FIG. 4 shows an embodiment of a separator.

FIG. 4 shows an embodiment of the separator wherein the reactant mixture 400 may be fed into the separator 101. The reactant mixture may follow a helical path defined by the plates 402 disposed within the separator 101. Gaseous products 401 may be withdrawn in the product line 102 and liquid products 403 may be withdrawn in the liquid product line 404. In some aspects, the plates may have a plurality of perforations that allow gaseous products to pass through an exit through the product line 102.

Figure 5A:
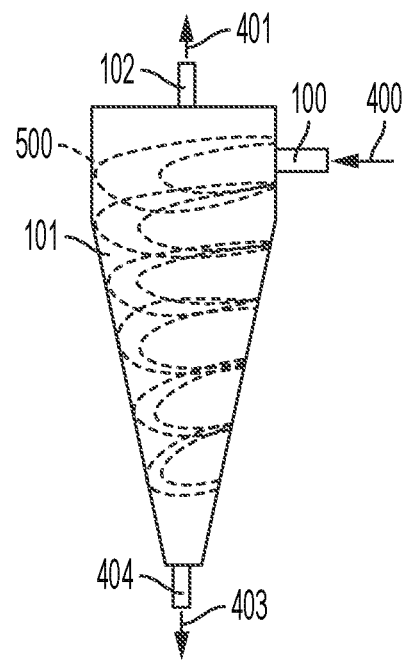
FIG. 5A shows an embodiment of a conical-shaped separator.
Figure 5B:
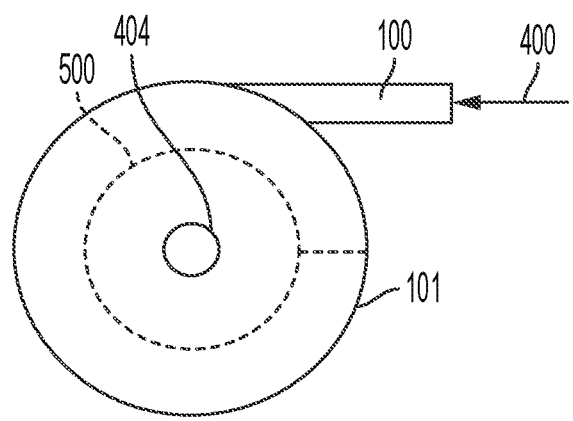
FIG. 5B shows a cross-sectional top view of the conical-shaped separator.

FIG. 5A shows an embodiment of the separator wherein the separator 101 has a conical shape that is conducive to producing a helical path 500 of the reactant mixture 400 in the separator. The inner surface of the separator 101 may include fins or plates projecting into the center of the conical shaped separator that facilitate movement of the reactant mixture 400 in a helical path 500. FIG. 5B shows a cross-sectional top view of the conical-shaped separator of FIG. 5A.

Figure 6:
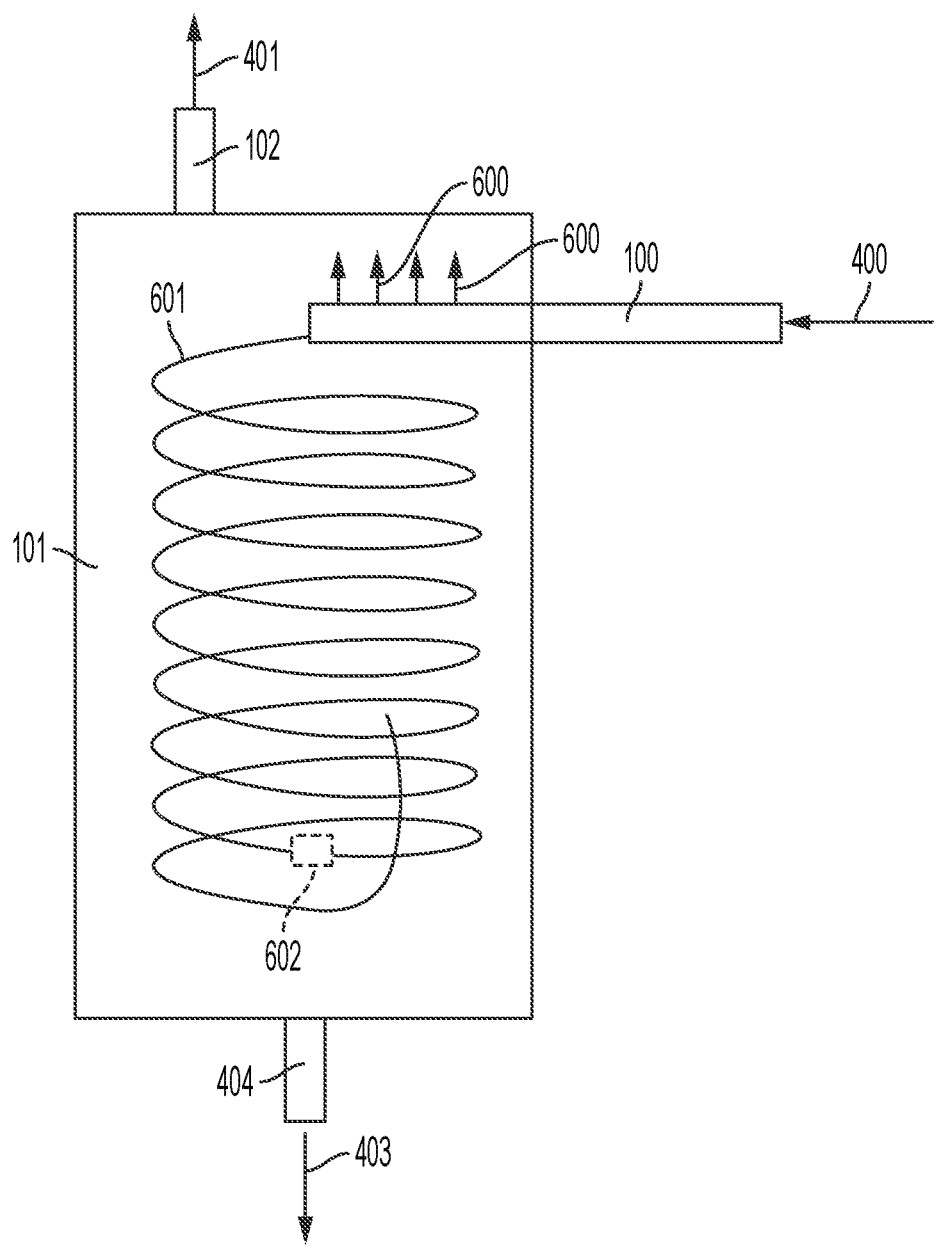
FIG. 6 shows an embodiment of a separator.

FIG. 6 shows an embodiment of a separator wherein the reactant feed line 100 may be a plurality of perforations or holes 600 that allow gaseous products to exit the tube. The reaction mixture may travel through the tube 601 in a helical path downward through the separator 101. The contents of the tube exit at the bottom of the separator 101. Liquid 403 may be removed from the separator through line 404.

In some aspects, the tube 601 may include at least two, three, four, or more contact zones 602. The contact zone may comprise an inner diameter at least about two times larger than an inner diameter of the tube. In some aspects, the contact zone may comprise an inner diameter at least about three, four, or five times larger than an inner diameter of the reactor.

In some aspects, the tube may have a length in a range from about 25 inches to about 300 inches. In some embodiments, the reactor may have a length in a range from about 30 inches to about 90 inches, about 30 inches to about 80 inches, about 30 inches to about 70 inches, about 30 inches to about inches, about 30 inches to about 50 inches, about 40 inches to about 90 inches, about 40 inches to about 80 inches, about 35 inches to about 45 inches, or about 35 inches to about 60 inches. In other aspects, the tube may be about inches in length.

In some aspects, the tube may have an inner diameter in a range from about 0.1 inches to about 4 inches. In some aspects, the tube may have an inner diameter in a range from about 1 inch to about 1.25 inches, or about 0.25 inches to about 1.25 inches. In some aspects, the tube may have an inner diameter of about 0.25 inches, about 2 inches, about 3 inches, or about 4 inches. In other aspects, the tube may have an inner diameter of about 1.25 inches, about 1 inch, about 0.75 inches, about 0.375 inches, or about 0.1875 inches.

Figure 7:
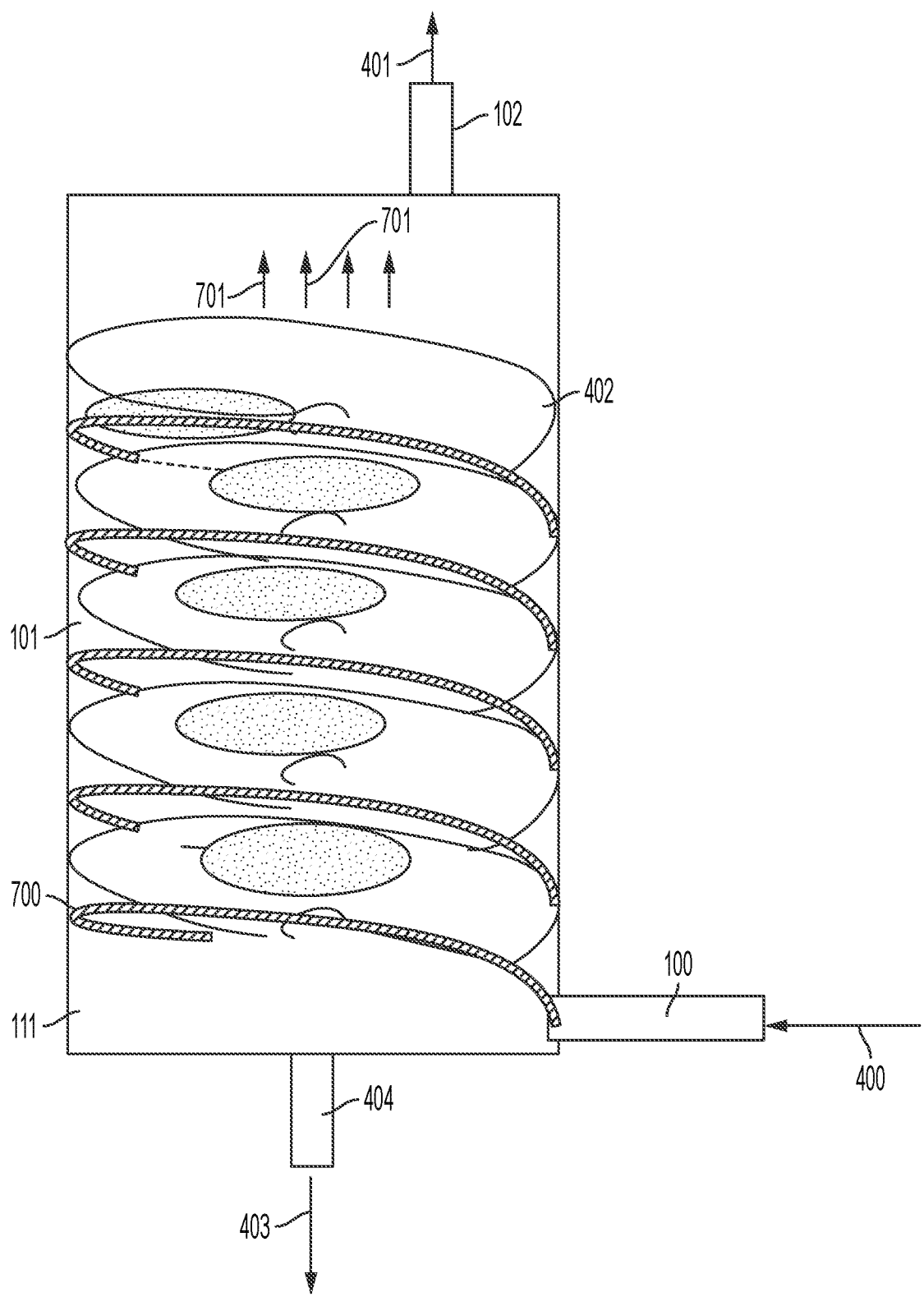
FIG. 7 shows an embodiment of a separator.

FIG. 7 shows an embodiment of the separator. In this embodiment, the reaction mixture 400 may be fed into a bottom portion of the separator 101. In some aspects, the reaction mixture may be fed into a top portion of the separator. In some aspects, the reaction mixture may be fed into a middle portion of the separator.

FIG. 7 also shows that gaseous products 701 may pass through perforations or holes in plates 402 disposed within the separator 101. In some aspects, only the top plate at the top portion of the separator has holes or perforations to allow gas to pass through the plate 402 and into the product line 102.

Figure 10:
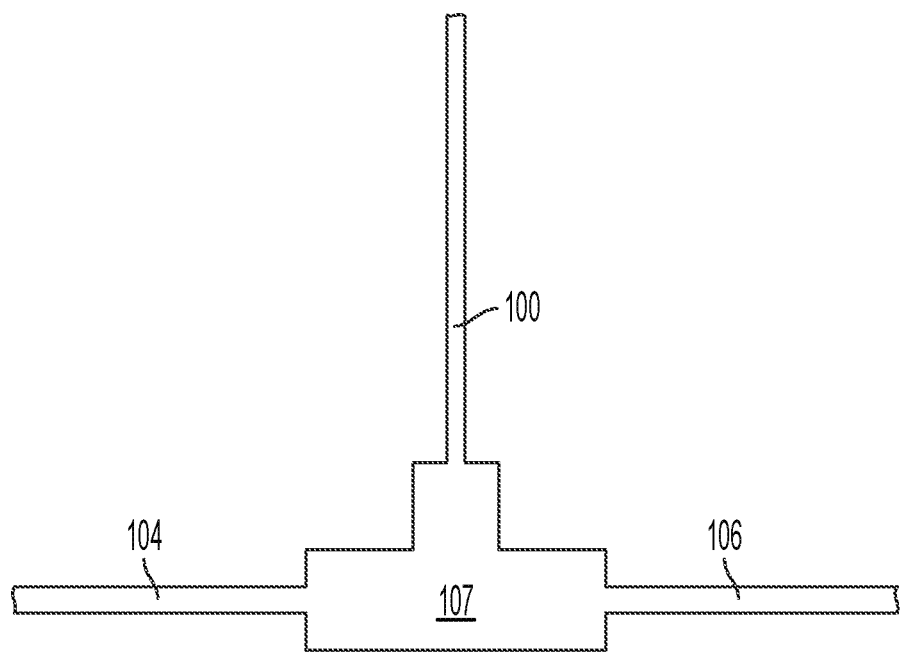
FIG. 10 shows an embodiment of the mixer and reactant feed lines.

FIG. 10 shows an embodiment wherein the first feed line 104 and the second feed line 106 are opposite to and directed against each other. As the solutions enter the mixer 107, the solutions can mix more uniformly and be fed into the reactant feed line 100. The first feed line and the second feed line may be opposite to and directed against each other as in a "T" configuration, see, for example, the orientation of components corresponding to reference numerals 104 and 106 in FIG. 10.

In some aspects, the helical path is defined by a tube having a coiled configuration having a coil plane angle of about 1 degree to about 60 degrees. In some aspects, the coil plane angle may be from about 5 to about 30 degrees. The tube having a coiled configuration may include a coil diameter. The coil diameter may be in a range from about 0.1 to about 16.0 inches, about 1 inch to about 16 inches, about 2 inch to about 16 inches, about 2 inch to about 10 inches, or about 2 inches to about 4 inches.

Figure 11:
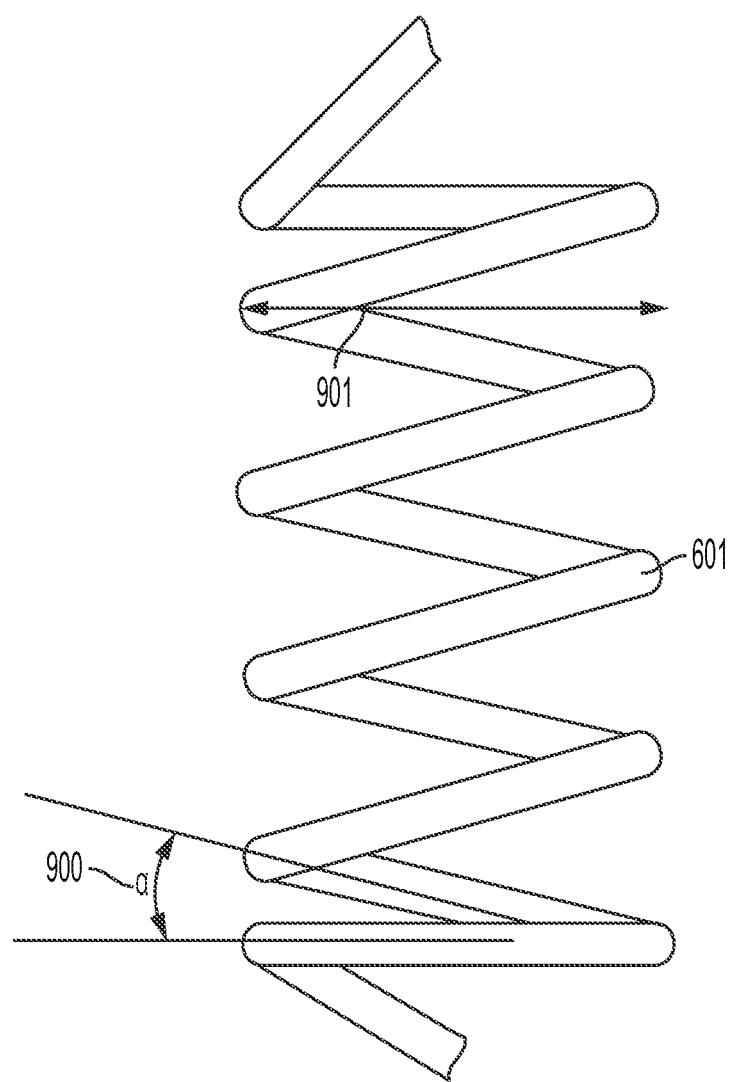
FIG. 11 shows an embodiment of the coiled tube disposed within the separator.

FIG. 11 shows an embodiment where the tube 601 may comprise a coiled configuration. The tube having a coiled configuration may include a coil plane angle 900 ranging from about 5 to about 30 degrees. The tube having a coiled configuration may include a coil diameter 901. The coil diameter 901 may range from about 0.1 inch to about 4.0 inches.

In some aspects, the separator may be operated at a pressure about equal to or less than atmospheric pressure. Atmospheric pressure may range from about 33 kPa to about 107 kPa. In some aspects, the operating pressure is about 106 kPa. In some aspects, the separator is operated under a vacuum.

In some aspects, the method may include withdrawing chlorine dioxide using an eductor. Other means may be used to withdraw chlorine dioxide from the separator and the present disclosure is not limited to use of an eductor.

In some aspects, the method may include operating the separator at a temperature in a range from about 2° C. to about 80° C. In some aspects, the method may include operating the reactor at a temperature of about 60° C.

In some aspects, the temperature of the motive water may be in a range from about 2° C. to about 80° C. The motive water temperature may be in range from about 15° C. to about 70° C., about 30° C. to about 70° C., about 40° C. to about 70° C., about 40° C. to about 60° C., or about 50° C. to about 70° C.

In some aspects, the reaction mixture may have a residence time in the separator of about 0.1 minute to about 1 hour. In some aspects, the reaction mixture may have a residence time in the reactor of at least about 1 minute. In other embodiments, the reaction mixture may reside in the reactor for at least about 3 minutes, at least about 4 minutes, at least about 5 minutes, at least about 6 minutes, at least about 7 minutes, at least about 8 minutes, at least about 9 minutes, or at least about 10 minutes. In some embodiments, the reaction mixture may have a residence time in the reactor of about 3.8 minutes. Residence time may be calculated by dividing total separator liquid volume by total reactant flow rate.

In some aspects, the method may include producing the chlorine dioxide at a rate ranging from about 0.001 lb/hour to about 200 lb/hour. In some aspects, the chlorine dioxide may be produced at a rate in a range from about 0.001 lb/hour to about 100 lb/hour. In some aspects, the chlorine dioxide may be produced at a rate in a range from about 0.02 lb/hour to about 15 lb/hour. In some aspects, the chlorine dioxide may be produced at a rate in a range from about 5 lb/hour to about 15 lb/hour.

In some aspects, the reaction may have an average conversion efficiency of at least about 90%.

In some aspects, the motive water line may comprise at least two channels. The channels may be longitudinal. In some embodiments, the motive water line may be a double containment pipe. The motive water line may have an inner channel and an outer channel through which motive water may flow, and the first and second solutions may be combined within the inner channel. The motive water flow rate in the outer channel may be different than the flow rate of the inner channel. The motive water flow rate may be such that the temperature of the reaction mixture is controlled within a certain range. The reaction mixture temperature may be about 2° C. to about 80° C., about 2° C. to about 70° C., about ° C. to about 70° C., about 40° C. to about 70° C., or about 50° C. to about 70° C. The reaction mixture temperature may be about 60° C.

A method of treating process water is provided. The method may include producing chlorine dioxide as described herein and injecting the gaseous chlorine dioxide into the process water.

In some aspects, the method may include determining a chlorine dioxide demand in the process water using measurements from a sensor, such as a chlorine dioxide sensor, an oxidation and reduction potential, a flow meter, a microbiological measurement, or any combination thereof. In some aspects, the chlorine dioxide may be added to the process water in a cooling tower.

In some aspects, the chlorine dioxide may be added to an aqueous system such as, for example a cooling tower. The present disclosure, however, is not limited to adding chlorine dioxide to process water in cooling towers. The process water may be used in the textile industry, laundry, paper production, mining, or energy services.

In some embodiments, the method may include a process control system including a Programmable Logic Controller (PLC), a chlorine dioxide analyzer, a pressure transmitter (PT) and a flow transmitter (FT), controls the feed pumps for the chemicals to the reactor and for the motive water.

In some embodiments, the method may include a distribution system. The distribution system may include at least two independently controlled dosing points. When the different $ClO_2$ production set points are entered into the controller, the PLC automatically calculates and adjusts the required production of the chlorine dioxide reactor. A distribution system may allow chlorine dioxide solution to be distributed to multiple points directly from the discharge chlorine dioxide reactor, thus avoiding a storage tank system. The distribution system may incorporate a $ClO_2$ solution pump and flowmeters and control valves to manage the distribution among various dosing points.

The flow meters that may be used with the disclosed methods may be any suitable flow meter, such as but not limited to clamp-on or pulse flow meters. Pulse-based flow meters detect the kinetic energy of flowing fluid using optical or magnetic sensors and converting it into electrical energy in the form of digital pulses. The flow rate can be determined by measuring the periods of the pulses.

The pumps used to feed the first and second solutions may be in communication with the PLC. The PLC may also be in communication with any pumps placed on a feed lines.

In some aspects, any of the methods disclosed herein may include sensing a pressure inside the separator. In some aspects, the product feed lines may be equipped with a check valve, flow meter, and feed pump.

In certain embodiments, any of the methods disclosed herein may include calculating a chlorine dioxide dose. The chlorine dioxide dose may be calculated using the flow rates of the, first solution, second solution, motive water, chlorine dioxide solution in the product feed lines, and the chlorine dioxide concentration. For example, the chlorine dioxide concentration in the main line can be calculated using the formula: Main Line Product Rate=$(F_p+F_a+F_w-F_{productline})$*$C_{ClO2}$ where $F_p$ is the flow rate of hydrogen peroxide and chlorate, $F_a$ is the flow rate of the acid, $F_w$ is the flow rate of the motive water, $F_{productline}$ is the sum of flow rates in any product feed lines connected to the main line, and $C_{ClO2}$ is the concentration of chlorine dioxide.

Multiple alarms and failsafe settings may be set using the PLC. For example, pump issues may be detected by monitoring the differential between the flow meter readings and the pump rate calculations. Some failsafes may include pressure relief valves on the separator or product feed lines. Any of the feed lines may have a pressure sensor that communicates readings to the main control device. By way of example, the main control device may include a PLC and an Adam AI/AO (analog input/analog output) module. If the reactor is housed in a cabinet, then the cabinet may have leak detection sensors and a cabinet door lock.

EXAMPLES

Figure 8:
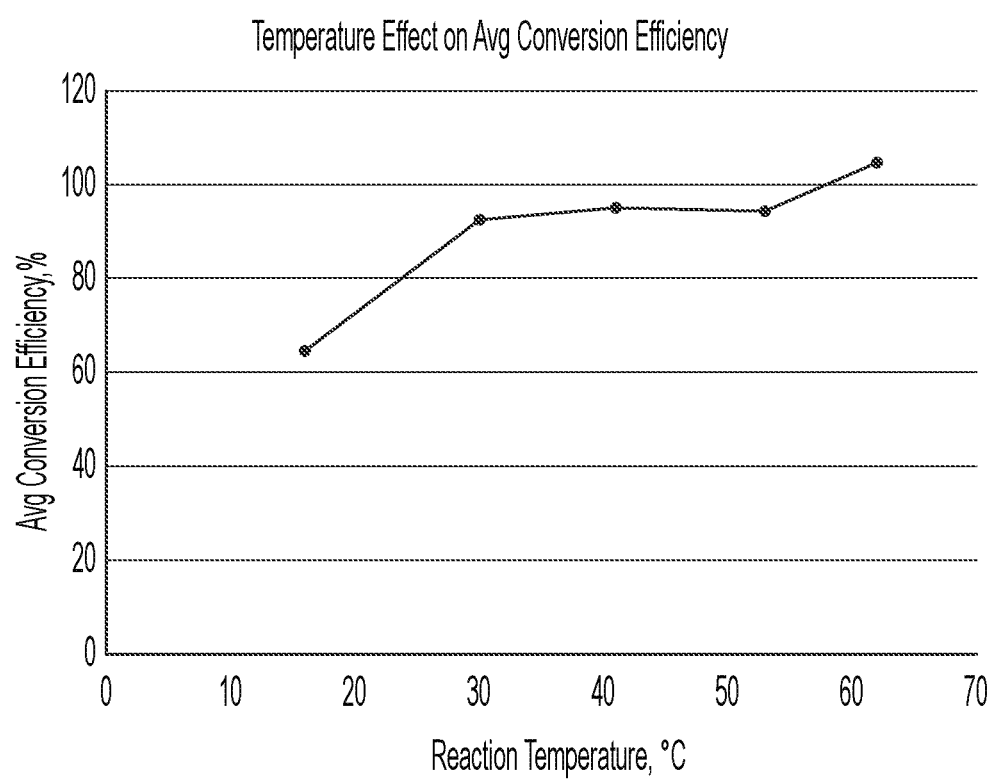
FIG. 8 shows the relationship between motive water temperature and average conversion efficiency.

Example 1: The effect of reactor temperature on conversion efficiency was measured. The tube diameter inside the separator was about ¼ inches with a $ClO_2$ production rate of about 0.085 lb/hr. Chemicals were fed via pump 103 and 105, mixed in device 107 then entered separator 601. Generated $ClO_2$ was separated from the reactants in the tube and the reactants continued down the path in the tube. FIG. 8 shows that the conversion efficiency increased with increasing temperature of the chemicals in reactions. In this reaction, the calculated residence time was about 14 minutes.

Figure 9:
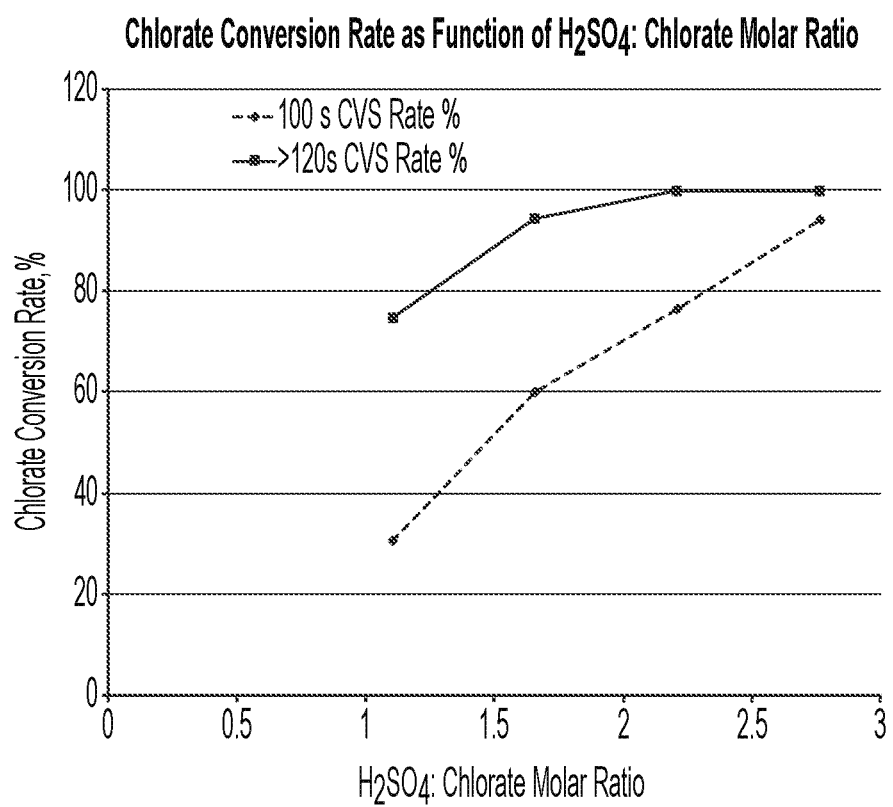
FIG. 9 shows the relationship between the molar ratio of sulfuric acid to chlorate and chlorate conversion.

Example 2: The effect on conversion of the mole ratio of acid to chlorate was tested. FIG. 9 shows that as the mole ratio increases, the chlorate conversion rate increased for both 100 s chlorate conversion rate (CVS) % and >120 s CVS rate %.

Example 3: The conversion rate was measure for a separator having a tube with about a ⅜ inch spiral tube within the separator. Table 1 shows the conversion rate for different liquid speeds.

TABLE 1

Effect of residence time and temperature on conversion rate.

| Residence Time min | Liquid speed cm/sec | Gas speed cm/sec | ClO₂ lb/hr | Gas Produced ml/min | Conversion Rate % |
|---|---|---|---|---|---|
| 50 | 0.04 | 4.5 | 0.1 | 8 | >99.0 |
| 24 | 0.09 | 9.2 | 0.2 | 17 | >99.0 |
| 11 | 0.19 | 19.8 | 0.5 | 36 | 91.5 |

Example 4: In this experiment, the temperature of the reactants was maintained at about 62° C. and the tube had about a ⅜ inch diameter. The residence time was calculated to be about 14 minutes.

TABLE 2

Acid reduction performance at 62° C.

| Temp. ° C. | Purate mol/min | H₂SO₄ mol/min | ClO₂ lb/hr | H₂SO₄/Purate mol/mol | Conversion Rate % |
|---|---|---|---|---|---|
| 62 | 0.0095 | 0.0254 | 0.085 | 2.68 | 99.7 |
|  |  |  |  | 2.20 | 102.4 |
|  |  |  |  | 1.71 | 95.3 |
|  |  |  |  | 1.34 | 68.5 |

Example 5: In this experiment, the temperature was varied to observe the effects on conversion efficiency. The tube had about a ⅜ inch diameter. The residence time was calculated to be about 11.2 minutes.

TABLE 3

Reaction temperature effects on average conversion efficiency.

| Temp. ° C. | Purate mol/min | H₂SO₄ mol/min | ClO₂ lb/hr | H₂SO₄/Purate mol/mol | Conversion Rate % |
|---|---|---|---|---|---|
| 57.2 | 0.0515 | 0.1360 | 0.4593 | 2.64 | 91.5 |
| 63.4 |  |  |  |  | 90.8 |
| 63.6 |  |  |  |  | 87.1 |
| 65.2 |  |  |  |  | 4.7 |
| 65.9 |  |  |  |  | 6.5 |

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the apparatuses and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of producing chlorine dioxide, comprising:
    mixing a first solution and a second solution in a mixing device to form a reaction mixture;
    feeding the reaction mixture into a separator;
    directing the reaction mixture in a helical path through the separator;
    reacting the first solution with the second solution to produce gaseous chlorine dioxide within the separator; and
    withdrawing the gaseous chlorine dioxide from the separator;
    wherein the helical path is defined by a plurality of plates disposed within the separator, and wherein the helical path is defined by a tube having a coiled configuration having a coil plane angle of about 1 degree to about 60 degrees.

2. The method of claim 1, further comprising:
    feeding the first solution comprising an acid through a first feed line into the mixing device; and
    feeding the second solution comprising chlorite or chlorate through a second feed line into the mixing device;
    wherein the mixing device is in fluid communication with the separator.

3. The method of claim 2, wherein the acid is hydrochloric acid, phosphoric acid, sulfuric acid, hypochlorous acid, or any combination thereof.

4. The method of claim 2, wherein the acid comprises sulfuric acid and the second solution comprises chlorate and hydrogen peroxide.

5. The method of claim 2, wherein the acid comprises hydrochloric acid and the second solution comprises chlorite.

6. The method of claim 2, wherein the first feed line and the second feed line are opposite to and directed against each other.

7. The method of claim 1, wherein the separator is operated at a pressure about equal to or less than atmospheric pressure.

8. The method of claim 1, wherein the reaction mixture has a residence time in the separator of about 0.1 minute to about 1 hour.

9. The method of claim 1, further comprising producing the chlorine dioxide at a rate ranging from about 0.001 lb/hour to about 200 lb/hour.

10. The method of claim 1, further comprising operating the separator at a temperature ranging from about 2° C. to about 80° C.

11. The method of claim 1, wherein the reaction mixture is fed into a top portion of the separator.

12. The method of claim 1, wherein the reaction mixture is fed into a bottom portion of the separator.

13. The method of claim 1, wherein the reaction mixture is fed into a middle portion of the separator.

14. The method of claim 1, further comprising withdrawing liquid from the separator and recycling the liquid to the separator.

15. The method of claim 1, wherein the plurality of plates comprises a plate having perforations.

16. The method of claim 1, wherein an average conversion efficiency is at least about 90%.

17. A method of producing chlorine dioxide, comprising:
mixing a first solution and a second solution in a mixing device to form a reaction mixture;
feeding the reaction mixture into a separator;
directing the reaction mixture in a helical path through the separator;
reacting the first solution with the second solution to produce gaseous chlorine dioxide within the separator; and
withdrawing the gaseous chlorine dioxide from the separator;
wherein the helical path is defined by a plurality of plates disposed within the separator, and wherein the plurality of plates comprises a plate having perforations.

* * * * *